United States Patent [19]
Moss et al.

[11] 4,398,498
[45] Aug. 16, 1983

[54] EXPOSURE CHAMBER

[75] Inventors: Owen R. Moss, Kennewick; James K. Briant, Pasco, both of Wash.

[73] Assignee: Hazleton Systems, Inc., Aberdeen, Md.

[21] Appl. No.: 336,670

[22] Filed: Jan. 4, 1982

[51] Int. Cl.³ .............................................. A01K 1/03
[52] U.S. Cl. ................................................... 119/15
[58] Field of Search ....................... 119/15, 17, 18, 19, 119/30, 37

[56] References Cited
U.S. PATENT DOCUMENTS 4,216,741 8/1980 Moss ...................................... 119/15

4,305,347 12/1981 Hemenway et al. .................. 119/15

*Primary Examiner*—Hugh R. Chamblee
*Attorney, Agent, or Firm*—Joseph J. Hauth; Robert K. Sharp

[57] ABSTRACT

An exposure chamber includes an imperforate casing having a fluid inlet at the top and an outlet at the bottom. A single vertical series of imperforate trays is provided. Each tray is spaced on all sides from the chamber walls. Baffles adjacent some of the trays restrict and direct the flow to give partial flow back and forth across the chambers and downward flow past the lowermost pan adjacent a central plane of the chamber.

7 Claims, 6 Drawing Figures

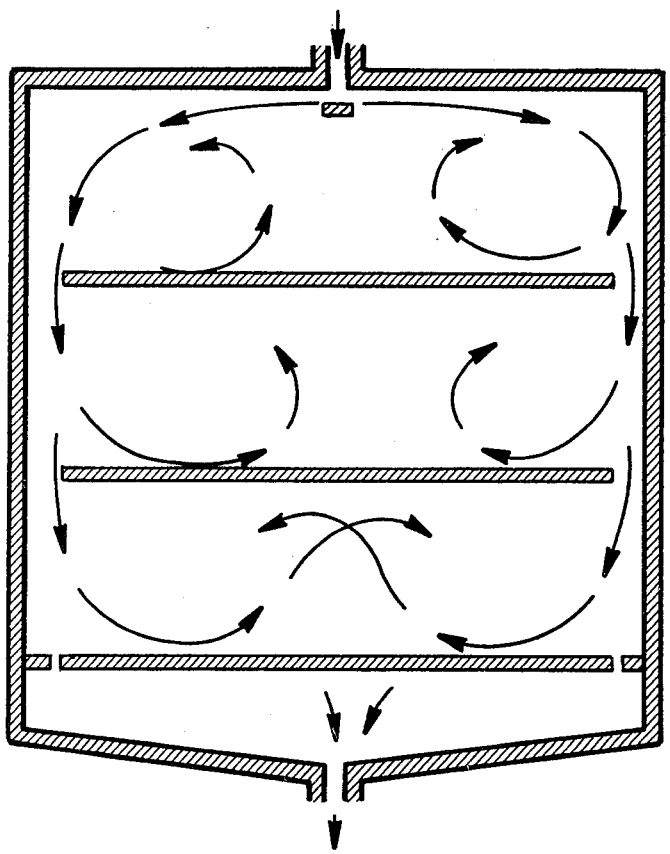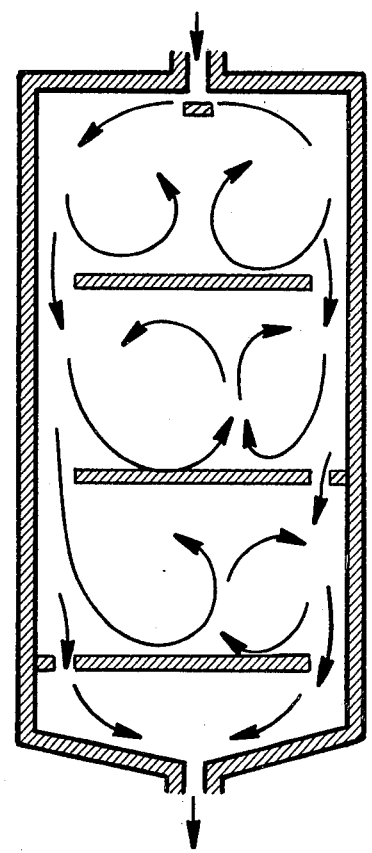
FIG. 5                                FIG. 6

1

EXPOSURE CHAMBER

INTRODUCTION

This invention relates to an exposure chamber. Such chambers are used to expose experimental animals to gases, usually air containing other gases or aerosols, to similarly expose various kinds of plant life and for processes such as smoking meat.

BACKGROUND

United States Pat. No. 4,216,741, granted Aug. 12, 1980, to Owen R. Moss and assigned to Hazleton Systems, Inc. discloses a chamber of the type mentioned above in which the catch pans of animal exposure chambers are converted from obstacles to the uniform distribution of gas within the chamber into instruments for its attainment. In this chamber, two "stacks" of trays are spaced from the walls of the chamber and spaced apart along a mid-plane of the chamber to provide spaces for the downward flow of gas between pans. In this arrangement vortices are produced between each pair of pans which result in uniform mixing of the gas or aerosol.

Exposure chambers of the type described in the Moss patent have been widely adopted and have proven very successful. They have been marketed commercially in a standardized size which is that described in the patent, that is to say, 50 inches (127 cm) wide by 49 inches (124.5 cm) deep by 6 feet 10 inches (208.3 cm) high, with an animal caging and exposure section 49 inches (124.5 cm) high. Six catch pans, 23 inches (58.4 cm) total width by 47 inches (119 cm) total length, in two vertical columns, are provided within the chamber.

It would be highly desirable to have a chamber of approximately half the width given above so that it could pass the usual doors. It would also be desirable for the pans and cages to be of the same size as those in the chamber described in the patent so that they would be interchangeable. The object of the present invention is to provide a chamber meeting the above requirements which still produces the uniform mixing obtained in the chamber described in the patent.

SUMMARY OF THE INVENTION

We have found that, instead of using two "stacks" of superimposed trays arranged in horizontally spaced pairs as disclosed in the Moss patent, we can utilize a single "stack" of trays which are spaced from the walls of the chamber but which do not provide an open path for gases down the center of the chamber as disclosed in the patent. Baffles are provided for properly direct and control the flow.

BRIEF DESCRIPTION OF THE DRAWING

FIG. 5 is a longitudinal vertical section of a model which was used in experiments to determine the circulation.

FIG. 6 is a transverse vertical section of the same model.

DETAILED DESCRIPTION

Figure 2:
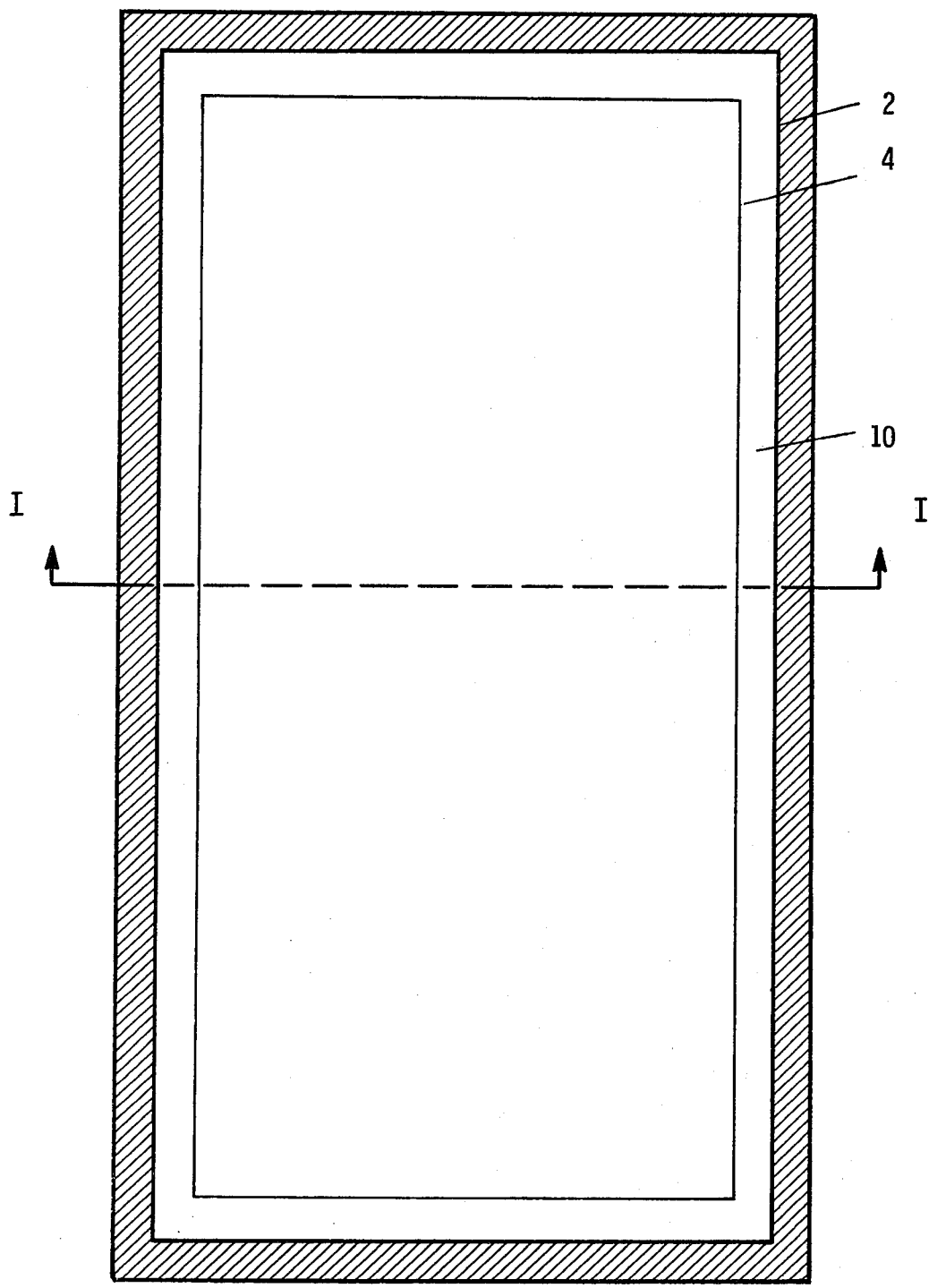
FIG. 2 shows a horizontal section taken on the line II—II, FIG. 1.
Figure 3:
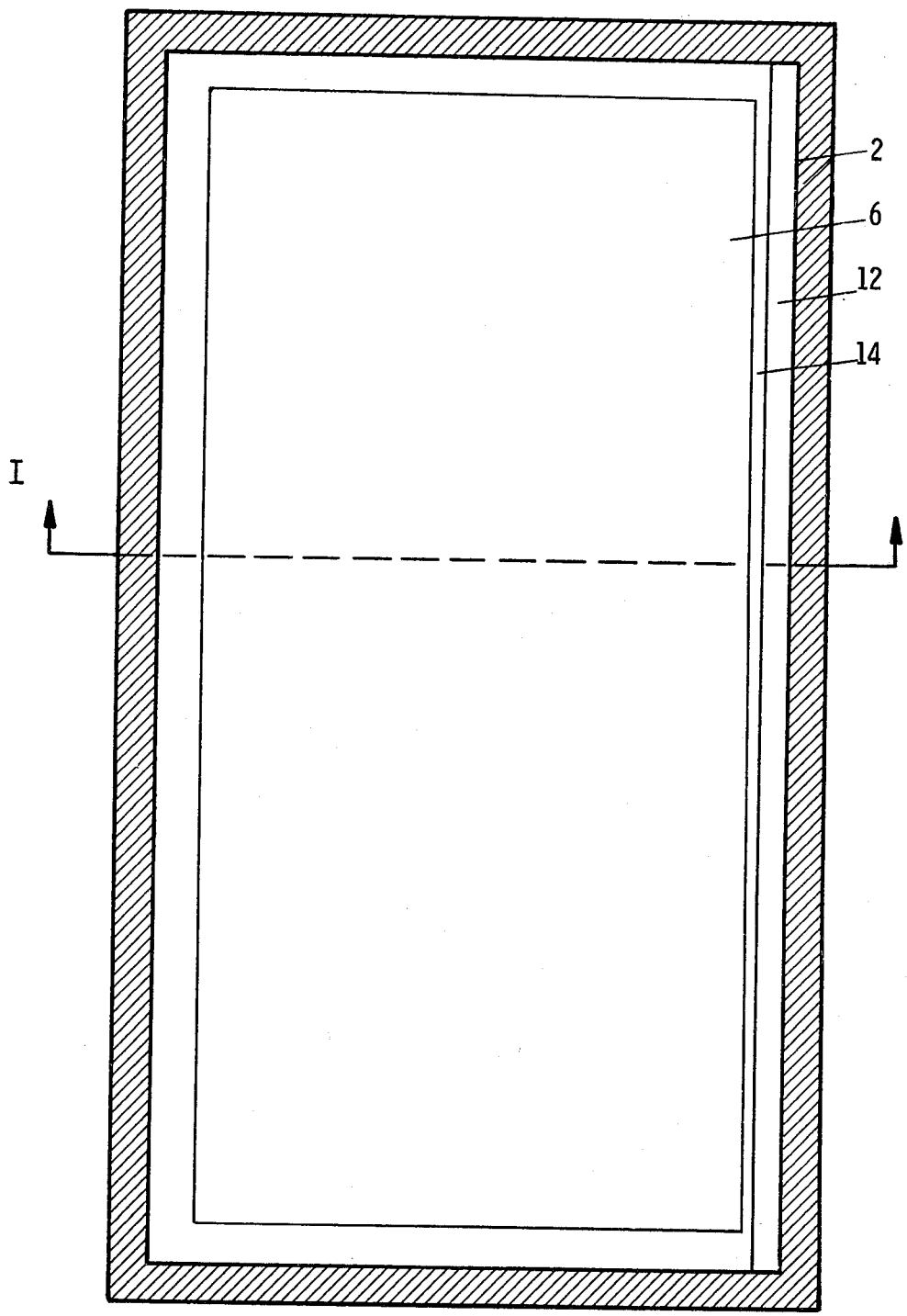
FIG. 3 shows a horizontal section taken on the line III—III, FIG. 1.
Figure 4:
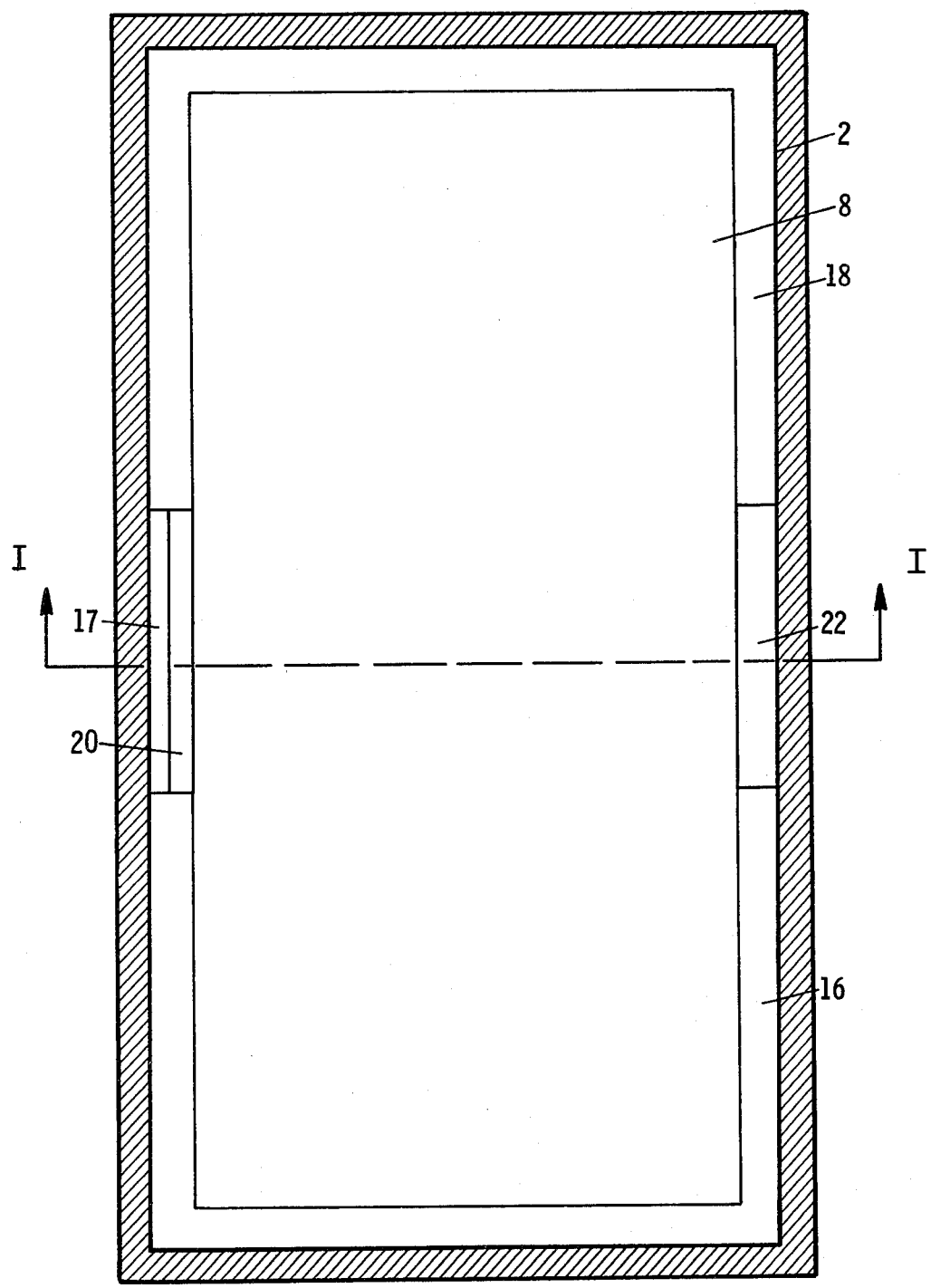
FIG. 4 shows a horizontal section taken on the line IV—IV, FIG. 1.

A chamber includes an outer casing 2. Within the chamber are trays 4, 6, and 8 which are removable and interchangeable. Tray 4, shown in FIG. 2, is impervious and is spaced on all four sides from the casing wall 2 by a space 10 which is sufficiently large to permit air or other fluid to flow downwardly but which is sufficiently small to prevent back-circulation. Width of this space may range from 5% to 10% of the width (smaller dimension) of the tray. Tray 6, like tray 4, is impervious and is spaced from the casing wall 2 as shown in FIG. 3. The space along one of the long sides is partially blocked by a baffle 12. The resulting space 14 between pan 6 and baffle 12 is about ¼ the width of the space 10. Tray 8 is likewise impervious and spaced from the chamber walls by the same distance (for convenience) as trays 4 and 6. It is, however, partially surrounded by U-shaped baffles 16 and 18, shown best in FIG. 4. The ends of these baffles are spaced apart near the transverse center-plane of the chamber leaving spaces 20 and 22. These spaces may extend from 20 to 30 percent of the length of the chamber. Space 20 is reduced to ½ the width of space 22 by a baffle 17 which is positioned on the side opposite baffle 12.

Baffles 12 and 17 cause the air to flow across the chamber to some extent, carrying the eddies along and promoting mixing. Since these baffles are on opposite sides, a back-and-forth flow is produced.

If the number of trays were increased, additional baffles like 12 would be provided with those on alternate trays positioned on opposite sides of the chamber.

It will be understood that instead of providing baffle 12, tray 6 could extend nearer to wall 2 on one side than on the other. It is, however, more convenient to standardize the size and position of the trays and provide the baffle 12. Also, instead of providing baffle 17, baffles 16 and 18 could be shaped to similarly restrict opening 20. Here, again it is most convenient to make baffles 16 and 18 symmetrical and provide the extra baffle 17. Still further, instead of providing baffles 16 and 18, tray 8 could extend to the chamber walls and be provided with suitably sized openings 20 and 22.

In operation, air or other fluid is introduced at the top of the chamber through inlet 24 and is deflected toward the side walls by deflector 26. A circulation pattern is produced which is essentially the same as that shown in the patent to Moss except that there is no flow downwardly through the central part of the chamber until the lowermost tray 8 is reached. Rather, all the fluid flows between trays 4 and 6 and the side walls. At tray 8 the fluid flows downwardly through spaces 20 and 22 to outlet 28. The chamber as thus described will produce a uniform concentration of aerosol or other fluid throughout the chamber to the same extent as that described in the patent.

EXPERIMENTAL EXAMPLE

The experiments that have been conducted to show the operability of this concept will now be described. A 1/6 scale model of the chamber was built for operation with water as the major fluid component. Under dynamically similar conditions the velocity of water in the top inlet of the model was approximately 0.4 times the velocity of air in the top inlet of a chamber built as described in the Moss patent. In the development of the chamber described in the Moss patent, the optimal configuration suggested by the same type model tests was confirmed to be correct in the full-scale chamber. Vertical longitudinal and transverse sections of this model are shown in FIGS. 5 and 6. Design ideas for the chamber were tested by injecting a 0.3 cc bolus of concentrated potassium permanganate into the inlet line. The circulation was observed visually and video tapes were made of the dye dispersion in the model chamber. The circulation patterns found to exist are shown in FIGS. 5 and 6. It was observed that with the pan and baffle arrangements shown uniform conditions were established within a very short time (less than 30 seconds).

For best results, the chamber should be relatively long and narrow, with a width approximately half or less of the length. However, it will still be operative if made wider, even to the point of being square. In such a form while uniform conditions will eventually be attained, it will, for a given air flow, require a greater length of time to establish equilibrium. In these broader chambers, the baffles 12 and 17, or equivalent means for restriction of flow, become still more important.

SPECIFIC EMBODIMENT

Figure 1:
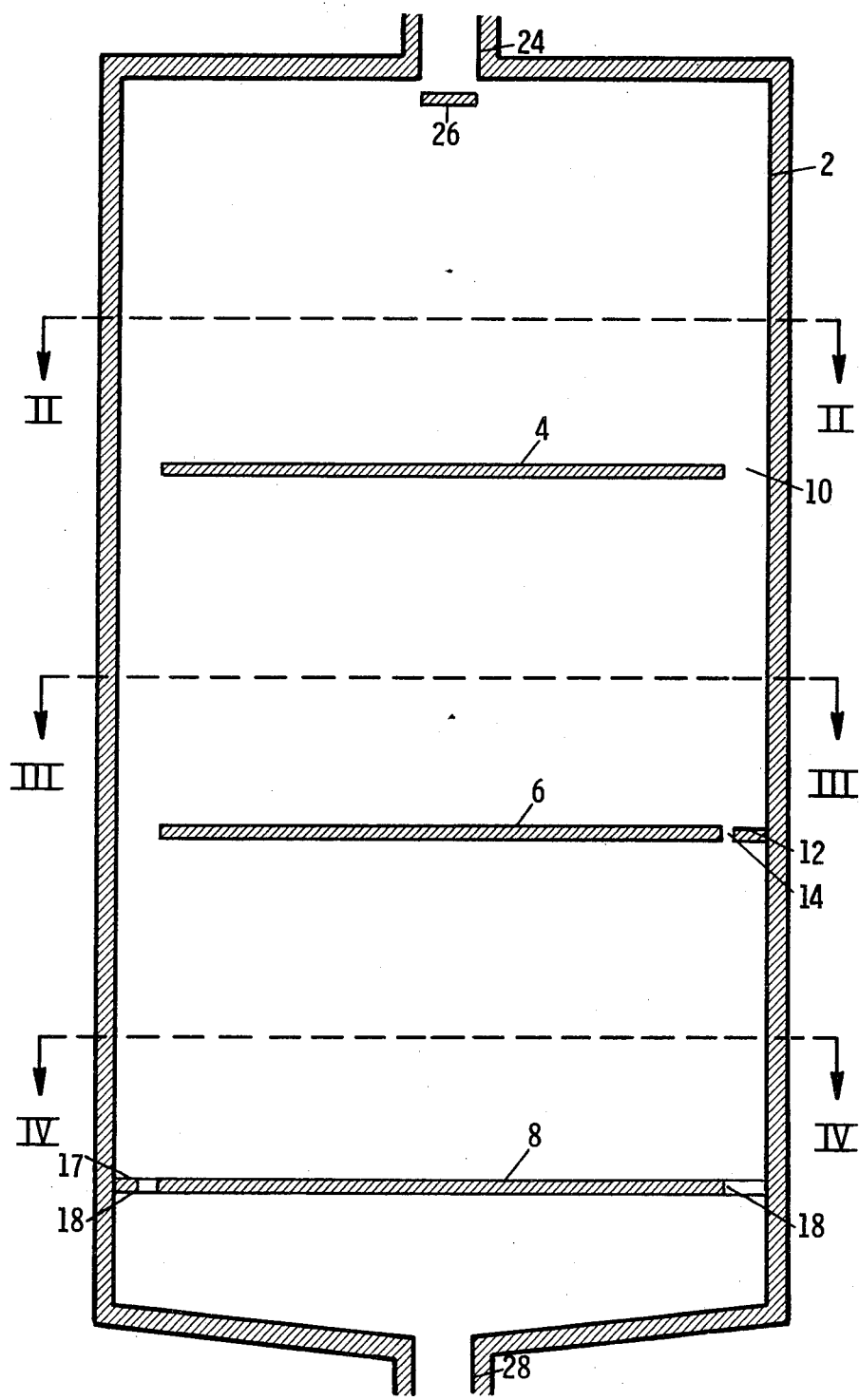
FIG. 1 shows diagrammatically a vertical section taken on a mid-plane of the chamber parallel to the smaller dimension of the chamber, taken on the line I—I of FIGS. 2, 3 and 4.

The best mode in which we have up to this time contemplated embodying our invention involves a chamber corresponding approximately to one-half of the chamber shown in FIG. 1 of the Moss patent. The chamber will be about 50½ inches (125.3 cm) long by 26⅜ inches (67.3 cm) wide by 50 inches (127.0 cm) high. Catch pans 4, 6, and 8 will be 23 inches (58.4 cm) wide by 47 inches (119.4 cm) long, spaced 1¼ inches (3.2 cm) from the casing on all four sides. Baffle 12 will be 15/16 inches (2.4 cm) wide leaving a space 14 of 5/16 inches (0.8 cm). Baffles 16 and 18 will be 1¼ inches (3.2 cm) wide so as to fill the space 10 where they occupy it. Spaces 20 and 22 will be 12¼ inches (31.1 cm) long. Baffle 17 will be ⅝ inch (1.6 cm) wide. The casing will be made of stainless steel with a single glass door at each end corresponding to door 41 of the Moss patent.

While we have described in detail a specific embodiment of our invention, it will be understood that various changes can be made. For instance, we have shown the top of the chamber as flat. It could, however, be made pyramidal as shown in the Moss patent except that the inlet would be centered over the single column of trays which we employ. The flow of fluid could be from the bottom upwardly. In that case the baffles around the lowermost pan would be omitted and an additional pan surrounded by baffles such as baffles 16 and 18 would be added above cage units positioned on pan 4. While our specific embodiment is based on the use of air or other gas it will be understood that treatment with liquid could also be carried out in a chamber of the same general type. This is illustrated by our use of a chamber employing liquid as a model for tests of our concept.

We therefore wish our invention to be limited solely by the scope of the appended claims.

The embodiments of the invention in which proprietary right or privilege is claimed are defined as follows:

1. A fluid treatment chamber comprising:
   a. imperforate substantially vertical front, rear, and side walls and closed upper and lower ends;
   b. a fluid inlet in one of said ends;
   c. a fluid outlet in the other of said ends;
   d. an inlet deflector adjacent said inlet constructed and arranged to deflect fluid introduced at said inlet towards said substantially vertical walls;
   e. a plurality of imperforate substantially horizontal pans within said chamber, each of said pans, other than that most remote from said inlet, being spaced from said vertical walls by distances which are sufficient to permit flow of fluid along said walls sufficient to supply fluid to pans downstream of it; but which are small compared to the horizontal dimensions of said pans, said pans otherwise occupying the entire cross sectional area of said chamber;
   f. means constructed and arranged to prevent substantial flow of fluid between said vertical walls and said pan most remote from said inlet except for an area adjacent a center-plane of said chamber, said means being constructed and arranged to provide open spaces on opposite sides of said pan, said spaces having materially different areas.

2. A fluid treatment chamber as defined in claim 1 so constructed and arranged that the open space between one edge of at least one intermediate pan and its adjacent vertical wall is substantially less than that between the opposite edge of said pan and its adjacent vertical wall.

3. A fluid treatment chamber as defined in claim 2 wherein a baffle is arranged along one edge of an intermediate pan to partially close the space between said edge and the chamber wall.

4. A fluid treatment chamber as defined in claim 1 wherein the spaces between the edges of said pans and said chamber wall have widths in the range of substantially 5% to 10% of the minimum horizontal dimension of said pans.

5. A fluid treatment chamber as defined in claim 2, and further comprising means providing two open spaces between said pan most remote from said pan most remote from said inlet and said vertical walls, said openings being of different areas and being positioned on opposite sides of said pan, the smaller of said openings being positioned adjacent the vertical walls opposite to the lesser opening adjacent said intermediate pan.

6. A fluid treatment chamber as defined in claim 1 wherein said fluid inlet is at the top and comprising three superimposed trays of substantially equal size, the uppermost tray being surrounded by an open space of substantially equal width about its periphery, the middle and lower trays being spaced from said vertical walls by distances substantially equal to the width of said open space, a first baffle along one edge of said intermediate tray filling a substantial proportion of the space between said tray and the adjacent vertical wall, a pair of U-shaped baffles positioned between the lowermost tray and the vertical side walls, said baffles having a width substantially equal to the distance between said tray and said vertical walls, one leg of each said first baffle, the ends of said U-shaped baffle being spaced apart to leave open spaces adjacent the center plane of said chamber, a final baffle partially closing said opening on the side of said chamber opposite to said first baffle, and wherein said fluid outlet is below said lowermost tray.

7. A fluid chamber as defined in claim 6 and further comprising additional intermediate trays, and baffles between one edge of each tray and the adjacent vertical side wall, the baffle adjacent successive trays being positioned at opposite sides to produce a back-and-forth movement of the fluid as it moves downwardly through the chamber.

* * * * *